Aug. 27, 1935. J. YOUNG Re. 19,684

COMBINATION DRILLING VALVE AND BLOW-OUT PREVENTER

Original Filed April 7, 1930 2 Sheets-Sheet 1

INVENTOR.
J. Warren MacClatchie
Assignee of John Young, Deceased,
BY
R. W. Smith
ATTORNEY.

COMBINATION DRILLING VALVE AND BLOW-OUT PREVENTER

Original Filed April 7, 1930 2 Sheets-Sheet 2

INVENTOR.
J. Warren MacClatchie
Assignee of John Young Deceased
BY
R. W. Smith
ATTORNEY.

Reissued Aug. 27, 1935 Re. 19,684

UNITED STATES PATENT OFFICE 19,684

COMBINATION DRILLING VALVE AND BLOW-OUT PREVENTER

John Young, deceased, late of Los Angeles, Calif., by J Warren MacClatchie, assignee, Los Angeles, Calif.

Original No. 1,858,352, dated May 17, 1932, Serial No. 442,155, April 7, 1930. Application for reissue September 20, 1933, Serial No. 690,224

12 Claims. (Cl. 166—15)

This invention relates to improvements in a combination drilling valve and blow-out preventer.

The general object of the invention is to provide an improved device of the class described which will not interfere with the drilling or the running in or out of the well and which will produce an effective shut-off around tools or pipes or when no tools or pipes are in the well.

A further object of the invention is to provide a blow-out preventer wherein a pair of rotatable members produce the shut-off action.

Other objects and advantages of the invention will be apparent from the following description taken in connection with the accompanying drawings wherein.

Figure 1:
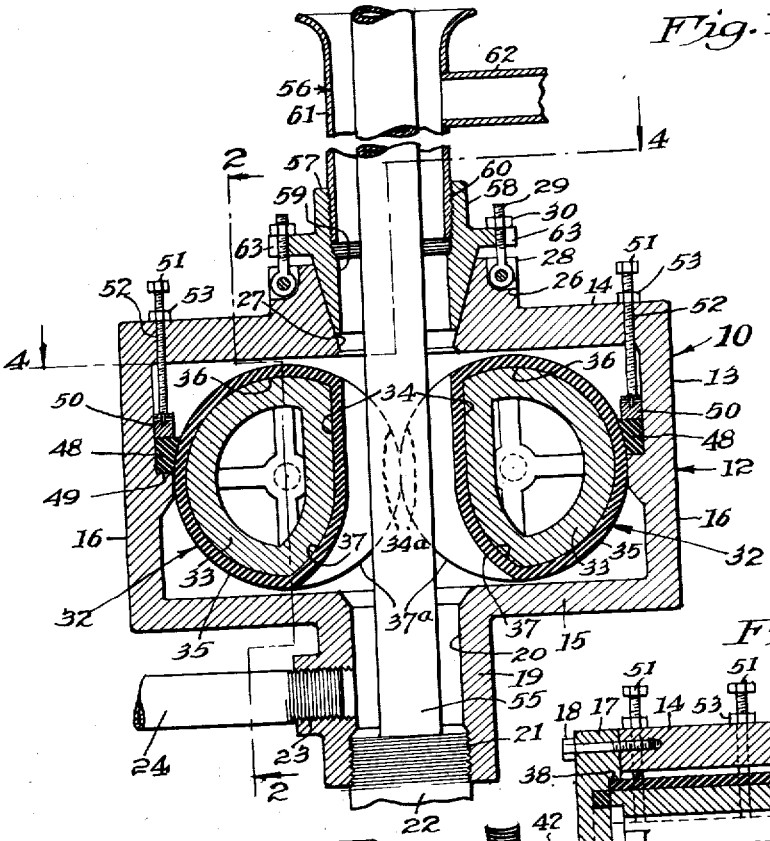
Fig. 1 is a central vertical section through the improved device.
Figure 2:
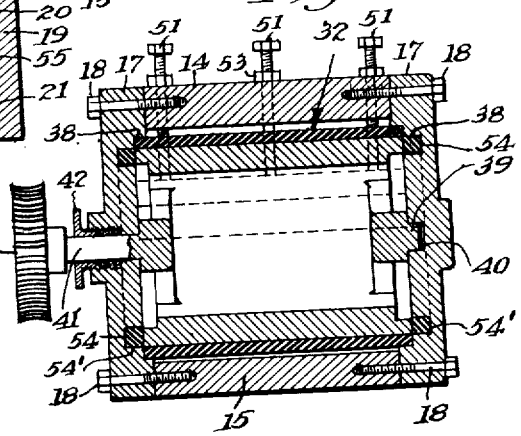
Fig. 2 is a section taken on line 2—2 of Fig. 1.
Figure 3:
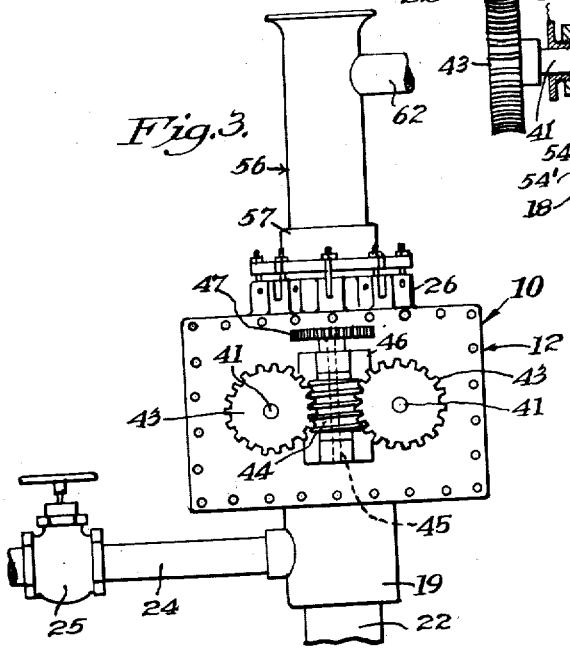
Fig. 3 is a side elevation of the device on a reduced scale.
Figure 4:
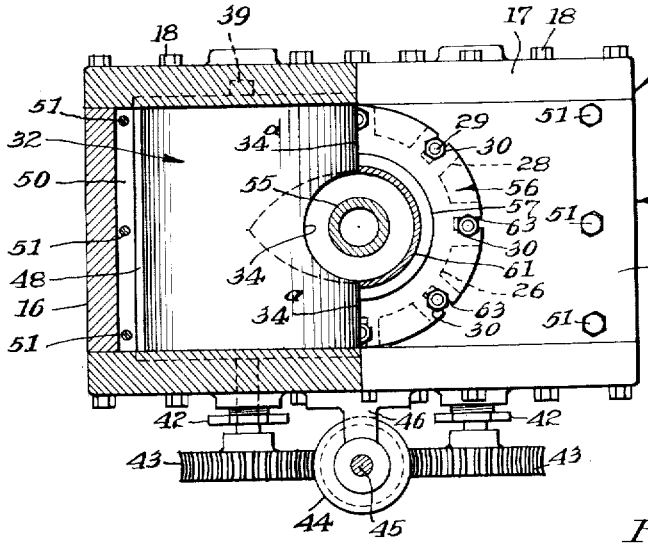
Fig. 4 is a section taken on line 4—4 of Fig. 1.

Referring to the drawings by reference characters the improved device is indicated generally at 10. As shown this device comprises a housing 12 which includes a casing 13 comprising a top 14, a bottom 15 and ends 16. A pair of sides 17 are secured to the casing by bolts 18.

Extending downward from the bottom 15 there is provided a neck 19 which includes an aperture 20 opening into the casing and the lower portion of which is threaded as at 21 for securing it to the well casing or other suitable support 22.

The neck 19 is preferably provided with a threaded aperture 23 in which there is secured a pipe 24 which is preferably provided with a control valve 25 and which may extend to a suitable reservoir.

The top 14 is provided with a neck 26 which includes a frustro conically shaped aperture 27 which is coaxial with the aperture 20 and converges toward the casing and opens thereinto. The lower end of the aperture 27 is approximately the same diameter as the diameter of the aperture 20. The neck 26 included a plurality of spaced pairs of lugs 28, between each pair of which there is pivotally secured a threaded bolt 29 having a nut 30 thereon.

Figure 5:
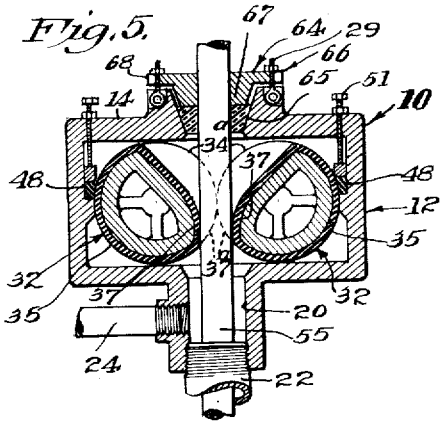
Fig. 5 is a view on a reduced scale similar to Fig. 1 showing the device actuated to shut-off around a string of drill tubing.
Figure 7:
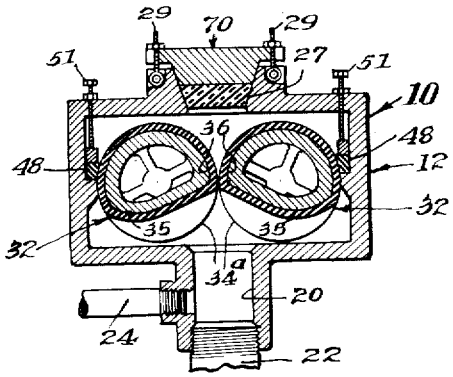
Fig. 7 is a view similar to Fig. 5 showing the device actuated to close the passageway in the well when no drill tubing is in the well.
Figure 6:
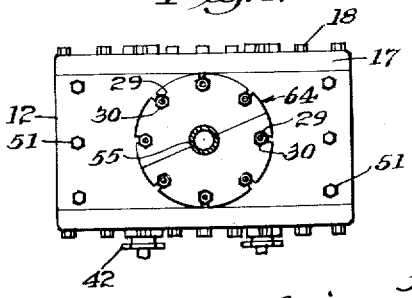
Fig. 6 is a top plan view of Fig. 5.

Within the housing 12 there is provided a pair of rollers 32 which preferably comprise metal cylinders 33 adapted for dependent rotation to any one of the positions shown respectively at Figs. 1, 5, and 7; the cooperating rollers when in the position shown at Fig. 1 providing a vertical opening between the rollers through which drill tubing or the like may be freely inserted or withdrawn from well casing 22, and the cooperating rollers when turned to the position shown at Fig. 5 forming a restricted vertical opening between the rollers adapted to snugly engage drill tubing so as to provide an effective shut-off around said tubing, and the rollers when turned to the position shown at Fig. 7 completely closing the opening between the rollers so as to provide a shut-off for casing 13 when the drill tubing has been withdrawn from the well casing.

For this purpose the cylinders 33 have cooperating peripheral portions 36 adapted to contact on the axis of apertures 20—27 when the rollers are dependently turned to the position shown at Fig. 7, thereby leaving no opening between the rollers. At one end of their peripheral portions 36 the cylinders 33 have cooperating recesses 34 medially of the axial length of the cylinders and adapted to form a vertical opening between the rollers when turned to the position shown at Fig. 1, with the peripheral surfaces of the cooperating cylinders which are along the length of the cylinders beyond the recesses and which are shown at 34*a*, maintaining contact when the rollers are turned to the position of Fig. 1 so as to maintain an enclosure around the vertical opening which is formed, and with said opening in alinement with apertures 20—27 and having an uniform cross-sectional area appreciably greater than that of drill tubing which is to be inserted in well casing 22. At an end of recesses 34 the cylinders 33 have cooperating recesses 37 medially of the axial length of the cylinders and adapted to form an opening between the rollers when turned to the position shown at Fig. 5, with the peripheral surfaces of the cooperating cylinders which are along the length of the cylinders beyond the recesses 37 and which are shown at 37*a*, maintaining contact when the rollers are turned to the position of Fig. 5 so as to maintain an enclosure around the opening which is formed, and with said opening in alinement with apertures 20—27 and having a substantially circular cross-section of restricted radius whereby drill tubing may be received in the opening so as to be snugly embraced by the rollers. The recesses 34 are shown as grooves, semi-circular in cross-section and constituting chords of cylinders 33, and the recesses 37 are shown as grooves, semi-circular in cross-section and forming continuations of the chordal grooves 34, with the grooves 37 of diminishing radius so as to eventually merge into the peripheral surfaces 36.

Packing is preferably provided at the cooperating peripheral surfaces 36 so as to form a tight seal between the rollers when turned to the position shown at Fig. 7, and packing is preferably provided at grooves 37 and at peripheral surfaces 37a for tightly packing-off around drill tubing when the rollers are turned to the position shown at Fig. 5. In the illustrated embodiment of the invention these packing elements are provided by covering the entire periphery of each cylinder 33 with a material 35, such as a specially prepared rubber, which is vulcanized on each of the rollers and thereby overlies both its surfaces 36—37a and its groove 37. When the packing is in place the peripheral portions 36 of the cooperating rollers are adapted for tight sealing engagement, and the recesses 34 are adapted to define an opening which is of approximately the same size as apertures 20—27 and which is large enough to permit free withdrawal or insertion of drill tubing, and the grooves 37 define a restricted substantially circular opening adapted for tight sealing engagement of its packing around drill tubing which extends through said opening and with the peripheral portions 37a of the cooperating rollers also maintaining a tight sealing engagement.

It will thus be seen that the cooperating recesses 34 and the cooperating grooves 37 respectively define openings of appreciably different diameter; and in the illustrated embodiment of the invention wherein the grooves 37 are shown as having a diminishing radius, the opening defined by said grooves may be varied in diameter by dependently turning the rollers so as to adapt the opening to different sizes of drill tubing.

Each end of the rollers 32 are positioned in recesses 38 provided in the sides 17 and they each include a stud shaft 39 which is positioned in a bearing recess 40 provided in one of the sides 17 and a shaft 41 which extends through the opposite side 17 and is packed off by a packing gland 42. Adjacent the outer ends of the shafts 41 there is provided worm gears 43 which mesh with a worm pinion 44 on a shaft 45 positioned in bearings 46 and secured to the shaft 45 there is shown a sprocket wheel 47 which may be remotely operated by a sprocket chain.

It will be understood of course that a hand wheel, an electric motor, or any other suitable device may be used for rotating the shaft 45.

In each of the various positions to which rollers 32 are turned when the device is in use, as shown at Figs. 1, 5 and 7 respectively, and while the rollers are being turned to these various positions, the packing 35 at the peripheral surface 36 of each roller, maintains a packing engagement with a cooperating element at the proximate end 16 of the casing 13. This cooperating element may comprise a packing member 48 which is preferably made of a specially prepared rubber or other resilient material and which is adapted to rest on a seat 49 integral with the end 16. For compressing and expanding each of the packing members 48 there is provided a metal bar 50 which is adapted to be moved against the packing member by a threaded bolt 51 which extends through a similarly threaded aperture 52 in the top 14 and is provided with a nut 53 for locking it in an adjusted position.

The ends of the rollers 32 which are positioned in the recesses 38 are adapted to engage packing rings 54 which are positioned in annular grooves 54' in the recesses 38. These packing rings may be made of rubber or other suitable material and are normally of greater depth than the depth of the grooves 54' so that when the device is operatively assembled the ends of the rollers compress the packing rings.

From the foregoing it will be seen that when the rollers 32 are positioned as shown in Fig. 1 with the recesses 34 defining a straight vertical opening between the rollers there is an unobstructed passageway through the device of approximately the same diameter as the diameter of the aperture 20, whereby drill tubing may be freely withdrawn or inserted. When the rollers are rotated by means of the worm pinion 44 and the worm gears to the position shown at Fig. 5 the grooves 37 define a restricted substantially circular opening between the rollers adapted for reception of drill tubing so as to pack-off around said tubing; and when the drill tubing has been withdrawn and the rollers are turned to the position shown at Fig. 7, their cooperating surfaces 36 completely close and seal the opening between the rollers.

During a drilling operation when there is a string of drill tubing 55 operating in the well there is provided a drilling nipple 56 on the device 10. As shown this drilling nipple includes a body portion 57 having a downwardly extending frustro-conically shaped collar 58 which is adapted to be postioned in the aperture 27 of the neck 26. The collar 58 is provided with an aperture 59, the upper portion of which is threaded as at 60 for securing thereto a pipe 61. The pipe 61 is preferably outwardly flared at its upper end and has a flow pipe 62 extending therefrom. The body portion 57 is provided with a plurality of slots 63 in which the bolts 29 are adapted to be positioned and the nuts 30 are adapted to secure the drilling nipple in position on the housing 12.

Should the well start to blow in while the drill tubing 55 is in the well the rollers are rotated until the opening between the rollers is restricted by alinement of the cooperating grooves 37 so that the rollers snugly embrace and pack-off around the drill tubing as shown at Fig. 5. When the rollers are in this position the gas in the well cannot pass through the device around the drill tubing and the packing members 48 prevent the gas pressure from passing around the rollers.

After the rollers have been actuated so as to seal around the drill tubing the drilling nipple 56 may be moved out of engagement with the device and a plug 64 put in its place. As shown this plug comprises a split ring 65 which fits around the drill tubing and which is made of a resilient material such as a specially prepared rubber and a split metal clamping member 66 which surrounds the drill tubing.

The ring 65 is conically shaped and is positioned in the aperture 27 of the neck 26 and the clamping member 66 includes a conically shaped portion 67 which engages the ring 65 and a plurality of slots 68 in which the bolts 29 are positioned so that the nuts 30 clamp the plug in position. Thus, even though the rollers 32 give way, the plug 64 would still effectively pack off around the drill tubing.

When the device 10 is actuated to a closed position the pressure in the well may be relieved by opening the control valve 25 in the pipe line 24. When the device is actuated to a closed position when there is no drill tubing in the well as shown in Fig. 7 a solid plug 70 similar to the plug 64 is secured in position to close the passageway through the aperture 21.

What is claimed is:

1. In a drilling apparatus, the combination of a well casing, a drill stem rotatable in said casing, a supplementary casing, there being an aperture in said supplementary casing through which said drill stem extends, a pair of cylinders rotatably mounted in said supplementary casing, said cylinders having aligned peripheral grooves medially of the axial length of the cylinders, said grooves being arranged to form circular apertures of varying diameters by rotating the cylinders, and resilient packing in the grooves and at the peripheral surfaces of the cylinders along their length beyond their grooves and around the cylinders, the resilient packing providing a sealing surface around the circular apertures and maintaining a sealing engagement between the cooperating cylinders and between the supplementary casing and the respective cylinders throughout rotation of the cylinders.

2. In a device of the class described, a casing, an aperture in the bottom of said casing, an aperture in the top of said casing, said apertures being coaxial, a pair of rollers in said casing, recesses in the sides of said casing, said rollers extending across said casing and the ends of said rollers being positioned in said recesses, a groove in each of the rollers medially of its axial length, said grooves being semi-cylindrical, one portion of said grooves being of approximately the same radius as the radii of said casing apertures and diminishing to a point on the periphery of said rollers, said grooves in one position of said rollers forming a passageway through said casing of approximately the same diameter as the diameter of said casing apertures and upon rotation of said rollers the shape of said passageway remaining circular and diminishing until completely closed by the periphery of said rollers, and a resilient covering on each roller at its groove and at its peripheral surface along its length beyond its groove and extending completely around the roller, said resilient coverings providing a sealing surface around the passageway and sealing engagement between the cooperating rollers and between the casing and the respective rollers throughout rotation of the rollers.

3. In a device of the class described, a casing, an aperture in the bottom of said casing, an aperture in the top of said casing, said apertures being coaxial, a pair of rollers rotatable in said casing, a groove in each of the rollers medially of its axial length, said grooves being semi-cylindrical, one portion of said grooves being of approximately the same radius as the radii of said casing apertures and diminishing to a point on the periphery of said rollers, said grooves in one position of said rollers forming a passageway through said casing of approximately the same diameter as the diameter of said casing apertures and upon rotation of said rollers the diameter of said passageway diminishing until completely closed by the periphery of said rollers, and resilient packing in the grooves and at the peripheral surfaces of the rollers along their length beyond their grooves and around the rollers, said packing providing a sealing surface around the passageway and maintaining a sealing engagement between the cooperating rollers and between the casing and the respective rollers throughout rotation of the rollers.

4. In a device of the class described, a casing, an aperture in the bottom of said casing, an aperture in the top of said casing, said apertures being coaxial, a pair of rollers in said casing, recesses in the sides of said casing, said rollers extending across said casing and the ends of said roller being positioned in said recesses, a resilient covering on said rollers, the periphery of said rollers being in engagement, a groove in each of said rollers, said grooves being semi-cylindrical, one portion of said grooves being of approximately the same radius as the radii of said casing apertures and said grooves diminishing to a point on the periphery of said rollers, said grooves in one position of said rollers forming a passageway through said casing of approximately the same diameter as the diameter of said casing apertures and upon rotation of said rollers the diameter of said passageway diminishing until it is completely closed by the periphery of said rollers, a packing member positioned between the periphery of each of said rollers and the adjacent end of said casing, a seat on which said packing members are positioned, a compression member associated with each of said packing members, a threaded bolt engaging each of said compression members, said bolts extending through threaded apertures in said casing and being provided with lock nuts, a shaft on each of said rollers, said shafts extending through said casing, a packing gland associated with each of said shafts, a gear on each of said shafts, said gears being in mesh with a common pinion gear and means to rotate said pinion gear.

5. In a device of the class described, a casing, there being an aperture in the bottom of said casing and an aperture in the top of said casing, said apertures being coaxial, a pair of rollers in said casing, recesses in the sides of said casing, said rollers extending across said casing and the ends of said rollers being positioned in said recesses, an annular groove in each of said recesses, a packing member in each of said grooves, the ends of said rollers being adapted to engage said packing members, said packing members when engaged by said rollers being in a compressed state, a resilient covering on said rollers, the periphery of said rollers being in engagement, a groove in each of said rollers, said grooves being arcuate, one portion of said grooves being of approximately the same radius as the radii of said casing apertures and diminishing to a point on the periphery of said rollers, said grooves in one position of said rollers forming a passageway through said casing of approximately the same diameter as the diameter of said casing apertures and upon rotation of said rollers the diameter of said passageway diminishing until completely closed by the periphery of said rollers, and means to rotate said rollers.

6. A valve for closing the space around pipes of various diameters, said valve including a casing and a pair of cylinders, each of said cylinders having a peripheral recess medially of the axial length of the cylinder, said recesses being in alignment, the recesses of said cylinders varying in width and depth and being shaped so that the walls of the recesses cooperate to form a passageway through the casing adapted to completely surround the pipes, the cylinders being adapted for rotation to vary the diameter of the passageway, a resilient covering on each cylinder at its recess and at its peripheral surface along its length beyond its recess and extending completely around its cylinder, said resilient coverings providing a sealing surface around the passageway and maintaining a sealing engagement between the cooperating cylinders and between the casing and the respective cylinders throughout rotation of the cylinders.

7. In a valve, a casing, a pair of juxtapositioned elements rotatable in the casing, the rotatable elements having recesses which when the elements are turned to one position cooperate to define an opening between the elements through which a pipe may be freely projected, the rotatable elements having grooves medially of their axial length which when the elements are turned to another position cooperate to define an appreciably restricted opening between the elements in which a pipe is adapted for reception with the grooved surfaces of the rotatable elements snugly embracing the pipe, and the rotatable elements having cooperating contact surfaces which when the elements are turned to still another position are adapted for contact to provide a closure between the elements when the pipe has been withdrawn, and resilient packing in the grooves and at the surfaces of the rotatable elements along their length beyond the grooves and at the cooperating contact surfaces of the elements and extending around said elements, the packing providing a sealing surface around the restricted opening and maintaining a sealing engagement between the rotatable elements along their length beyond their grooves when the rotatable elements are in the second mentioned position, and maintaining a sealing engagement between the cooperating contact surfaces when the rotatable elements are in the third mentioned position, and maintaining a sealing engagement between the casing and the respective rotatable elements at both the second and third mentioned positions of the elements.

8. In a valve, a casing, a pair of juxtapositioned elements rotatable in the casing, the rotatable elements having recesses which when the elements are turned to one position cooperate to define an opening between the elements through which a pipe may be freely projected, the rotatable elements having grooves medially of their axial length which when the elements are turned to another position cooperate to define an appreciably restricted opening between the elements in which a pipe is adapted for reception with the grooved surfaces of the rotatable elements snugly embracing the pipe, and the rotatable elements having cooperating contact surfaces which when the elements are turned to still another position are adapted for contact to provide a closure between the elements when the pipe has been withdrawn, and resilient packing in the grooves and at the surfaces of the rotatable elements along their length beyond the grooves and at the cooperating contact surfaces of the elements, the packing providing a sealing surface around the restricted opening and maintaining a sealing engagement between the rotatable elements along their length beyond their grooves when the rotatable elements are in the second mentioned position, and maintaining a sealing engagement between the cooperating contact surfaces when the rotatable elements are in the third mentioned position.

9. In a valve, a casing, a pair of juxtapositioned elements rotatable in the casing, the rotatable elements having chordal recesses which when the elements are turned to one position cooperate to define a straight unobstructed vertical opening between the elements through which a pipe may be freely projected, the rotatable elements having grooves medially of their axial length which when the elements are turned to another position cooperate to define an appreciably restricted opening between the elements in which a pipe is adapted for reception with the grooved surfaces of the rotatable elements snugly embracing the pipe, and the rotatable elements having cooperating contact surfaces which when the elements are turned to still another position are adapted for contact to provide a closure between the elements when the pipe has been withdrawn, and resilient packing in the grooves and at the surfaces of the rotatable elements along their length beyond the grooves and at the cooperating contact surfaces of the elements and extending around said elements, the packing providing a sealing surface around the restricted opening and maintaining a sealing engagement between the rotatable elements along their length beyond their grooves when the rotatable elements are in the second mentioned position, and maintaining a sealing engagement between the cooperating contact surfaces when the rotatable elements are in the third mentioned position, and maintaining a sealing engagement between the casing and the respective rotatable elements at both the second and third mentioned positions of the elements.

10. In a valve, a casing, a pair of juxtapositioned elements rotatable in the casing, the rotatable elements having grooves medially of their axial length which when the elements are turned to one position cooperate to define an appreciably restricted opening between the elements in which a pipe is adapted for reception with the grooved surfaces of the rotatable elements snugly embracing the pipe, and the rotatable elements having cooperating contact surfaces which when the elements are turned to another position are adapted for contact to provide a closure between the elements when the pipe has been withdrawn, and resilient packing in the grooves and at the surfaces of the rotatable elements along their length beyond the grooves and at the cooperating contact surfaces of the elements and extending around said elements, the packing providing a sealing surface around the restricted opening and maintaining a sealing engagement between the rotatable elements along their length beyond their grooves when the rotatable elements are in the first mentioned position, and maintaining a sealing engagement between the cooperating contact surfaces when the rotatable elements are in the second mentioned position, and maintaining a sealing engagement between the casing and the respective rotatable elements at each of said positions of the elements.

11. In a valve, a casing, a pair of juxtapositioned elements rotatable in the casing, the rotatable elements having grooves medially of their axial length which when the elements are turned to one position cooperate to define an appreciably restricted opening between the elements in which a pipe is adapted for reception with the grooved surfaces of the rotatable elements snugly embracing the pipe, and the rotatable elements having cooperating contact surfaces which when the elements are turned to another position are adapted for contact to provide a closure between the elements when the pipe has been withdrawn, and resilient packing in the grooves and at the surfaces of the rotatable elements along their length beyond the grooves and at the cooperating contact surfaces of the elements, the packing providing a sealing surface around the restricted opening and maintaining a sealing engagement between the rotatable elements along their length beyond their grooves when the rotatable elements are in the first mentioned position, and maintaining a sealing engagement between the cooperating contact surfaces when the rotatable elements are in the second mentioned position.

12. In a valve, a casing, a pair of juxtapositioned elements rotatable in the casing, the rotatable elements having recesses which when the elements are turned to one position cooperate to define an opening adapted to receive a pipe, the rotatable elements having cooperating contact surfaces which when the elements are turned to another position are adapted for contact to provide a closure between the rotatable elements when the pipe has been withdrawn, a packing member between the periphery of each of the rotatable elements and the adjacent wall of the casing, a seat for each of said packing members, and a compression member associated with each of said packing members.

J WARREN MacCLATCHIE,
*Assignee of John Young, Deceased.*